Nov. 7, 1967  W. E. WIER  3,351,844
GENERATOR WITH CONSTANT FREQUENCY TO VOLTAGE RATIO OUTPUT
Filed March 6, 1964  3 Sheets-Sheet 1

WITNESSES
Theodore F. Wrobel
James F. Young

INVENTOR
Walter E. Wier
BY Donald R. Lackey
ATTORNEY

# United States Patent Office 3,351,844
Patented Nov. 7, 1967

3,351,844
GENERATOR WITH CONSTANT FREQUENCY TO VOLTAGE RATIO OUTPUT
Walter E. Wier, Lima, Ohio, assignor to Westinghouse Electric Corporation, East Pittsburgh, Pa., a corporation of Pennsylvania
Filed Mar. 6, 1964, Ser. No. 349,867
4 Claims. (Cl. 322—79)

ABSTRACT OF THE DISCLOSURE

A self-excited alternating current generator and excitation systems therefor which will maintain the ratio of the output voltage to the output frequency of the alternating current generator substantially constant over the load capability range of the alternating current generator.

---

It is desirable, in many instances, to eliminate the requirement for a separate exciter or source of unidirectional potential in alternator or alternating current generator systems, by some form of self-excitation system. The cost of a separate excitation system is thus eliminated, as well as the accompanying reduction in equipment space and weight, and reduction in system maintenance.

However, most self-excitation systems utilize three current transformers in a three phase system, with the primary windings of the current transformer being connected in series circuit relation with the output terminals of the alternating current generator and the output conductors. Even if the desired transformation ratio is 1:1, two transformers would still be required for isolation purposes. It would be desirable to eliminate the necessity of utilizing any transformers, which would further reduce the initial cost, size, weight and maintenance of self-excited alternator systems.

Alternator systems may be utilized with different types of alternating current loads, with each type of load presenting a different problem for self-excited alternators. One type of load requires substantially constant alternator output voltage. In self-excited alternator systems, where the voltage regulation is accomplished without the benefit of a separate exciter, the field current the regulator is called upon to control may increase beyond the capabilities of an economical regulator. This is due to the fact that as the current output of the alternator is increased, the field current also increases. It would, therefore, be desirable to regulate the output voltage of a self-excited alternator by passing only a small percentage of the total excitation current through the voltage regulator. The size and cost of the regulator could thus be substantially reduced.

When the frequency of the alternator may vary, due to being driven by motor vehicle engines or other variable speed drives, one type of load requires that the ratio of the alternator output voltage to the alternator frequency be kept constant over the speed range of the driving source. For example, alternating current motors, such as those utilized with truck refrigeration systems, require a constant voltage to frequency ratio for efficient operation, and draw a constant line current when this ratio is maintained. When the alternator voltage to frequency ratio must be maintained constant, it is not possible to simply obtain the excitation voltage for the alternator field from an auxiliary rectifier, as is common with voltage regulated self-excited systems.

Thus, it is desirable to provide an uncomplicated, inexpensive method of providing self-excitation for alternator systems of the type that must maintain a constant voltage to frequency ratio.

Accordingly, it is an object of this invention to provide a new and improved self-excitation system for alternating current generators.

Another object of this invention is to provide a new and improved self-excitation system for alternators in which the requirement of utilizing transformers between the alternating current output terminals and direct current field winding has been eliminated.

A further object of this invention is to provide a new and improved self-excitation system for alternators which eliminates the requirement of utilizing current transformers and which regulates the alternator output potential by controlling a small portion of the total excitation requirements.

Still another object of this invention is to provide a new and improved self-excitation system for alternators which eliminates the requirement of utilizing transformers and which maintains an electrical output having a constant voltage to frequency ratio.

Briefly, the present invention accomplishes the above cited objects by connecting a three phase rectifier in the neutral connection of a three phase Y connected generator. This three phase rectifier supplies the excitation requirements to the direct current field winding of the generator without the necessity of utilizing current transformers. If the alternator system is of the type which requires the output voltage to be regulated, a smaller regulator may be used than with conventional excitation systems. The three phase rectifier connected in the neutral of the Y connected generator phase windings may be connected directly to the field excitation winding and designed to supply the major portion of the excitation requirement. An auxiliary winding, having a rectified output, may be disposed on the generator and connected to the field winding through a rectifier and voltage regulator. The auxiliary winding then supplies only the balance of the excitation required by the alternator to maintain the desired regulated output voltage. Thus, the regulator may be considerably reduced in rating, as only a small portion of the total excitation current is controlled by it. If the output voltage of the alternator provides a direct current voltage when rectified slightly greater than that required for maximum field excitation, it will not be necessary to provide an auxiliary winding.

If the alternator system is of the type which must maintain a constant voltage to frequency ratio, self-excitation may still be accomplished by connecting a reactor between one of the windings and to the connection of either of the other windings to the three phase rectifier. As the frequency and voltage increase, the reactance of the reactor also increases, and a substantially constant current through the reactor is achieved which is used to supply the field excitation winding.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
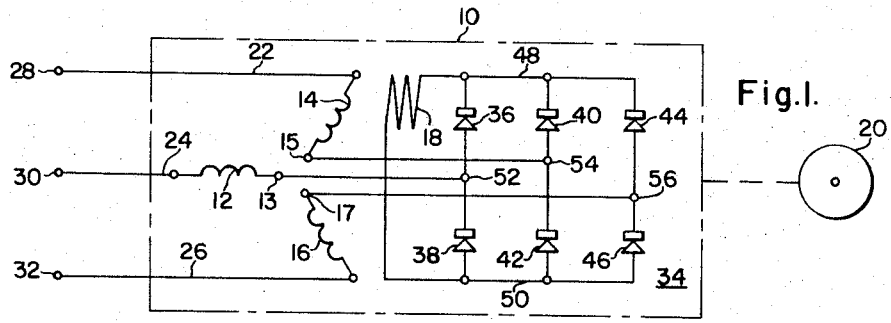
FIGURE 1 is a schematic diagram illustrating the connection of a three phase, full wave bridge-type rectifier in the neutral of a three phase Y-connected alternating current generator.

Referring now to the drawings, and FIG. 1 in particular, there is illustrated a three phase Y-connected alternator 10, having armature windings or phases 12, 14 and 16, and a direct current field winding 18. The alternator 10 is driven by a suitable prime mover 20, and delivers electrical energy through conductors 22, 24 and 26 to output terminals 28, 30 and 32, respectively.

The direct current field winding 18 is self-excited, receiving a direct current potential from three phase, full wave bridge rectifier 34. Bridge rectifier 34 is comprised of a plurality of rectifier devices 36, 38, 40, 42, 44 and 46, such as semiconductor diodes, and delivers a unidirectional potential to conductors 48 and 50 when an alternating potential is applied to terminals 52, 54 and 56.

Instead of connecting the neutral sides 13, 15 and 17 of armature windings 12, 14 and 16 respectively, to a common point, as customary, and obtaining the self-exciting potential from current transformers connected in circuit relation with output conductors 22, 24 and 26, the necessity of utilizing such current transformers has been eliminated by connecting the neutral sides 13, 15 and 17 of armature windings 12, 14 and 16 to terminals 52, 54 and 56 respectively, of bridge rectifier 34. The current from each phase 12, 14 and 16, will flow through their associated diodes 36, 40 and 44, respectively, through the field winding 18 and back to one of the other phases. Since the algebraic sum of the current in any balanced three phase system is zero, the current flowing in one phase will always be equal to the algebraic sum of the currents flowing in the other two phases.

Figure 2:
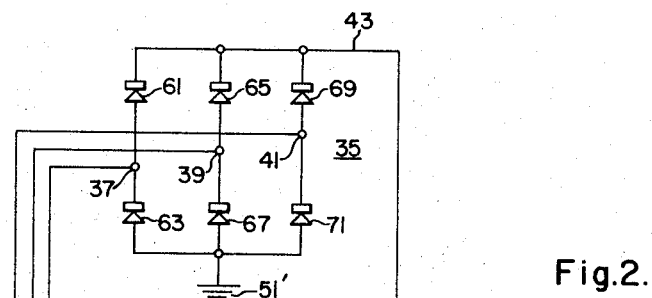
FIG. 2 is a schematic diagram illustrating a compound, self-excited alternator system utilizing the circuit of FIG. 1.

Compound excitation systems, which commonly obtain a first unidirectional potential from current transformers connected in the output circuit and a second unidirectional potential from a battery or auxiliary rectifier, may be modified as shown in FIG. 2 to eliminate the requirement of utilizing current transformers. Like reference numerals in FIGS. 1 and 2 refer to like components. The system may be made self-excited by connecting the alternator output to an auxiliary bridge rectifier 35, having rectifier devices 61, 63, 65, 67, 69 and 71, provided the alternator is driven at a constant speed, or a regulator is used to provide constant voltage output. More specifically, the input terminals 37, 39, and 41 of rectifier 35 are connected to the alternating current output terminals 30, 28 and 32, respectively, and the positive bus 43 of rectifier 35 is connected to the positive bus 48 of rectifier 34. Rectifiers 34 and 35 may be grounded at 51 and 51', respectively.

Figure 3:
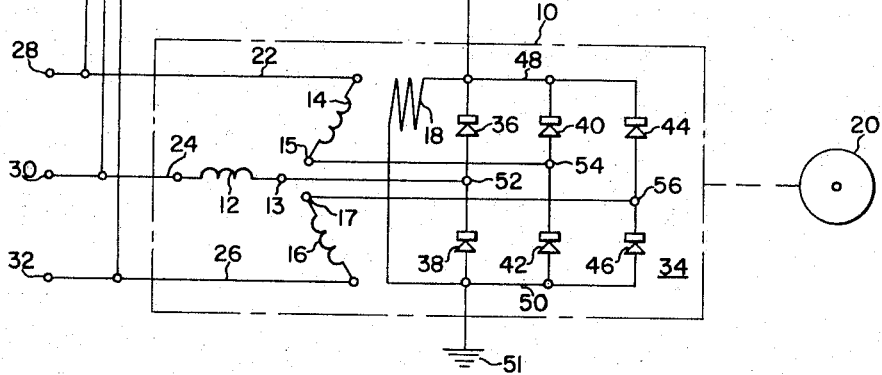
FIG. 3 is a schematic diagram illustrating the connection of a reactor in the circuit of FIG. 1 to provide a substantially constant voltage to frequency ratio.

If a variable speed system with a constant voltage to frequency ratio is desired, the alternator cannot be made self-excited by connecting the auxiliary rectifier to the alternator output terminal. The field current provided by this arrangement would vary and the alternator would not provide a constant voltage to frequency ratio. The circuit shown in FIG. 3 overcomes the problem of self-exciting variable speed alternator systems which require a constant voltage to frequency ratio. FIG. 3 is similar to FIG. 1, and like reference numerals refer to like components. My utilizing the rectifier 34 connected to the neutral connections 13, 15 and 17 of armature phase windings 12, 14 and 16, the advantage of eliminating current transformers is provided, as well as providing an inexpensive and effective way of exciting variable speed alternator systems to provide a constant voltage to frequency ratio. This is accomplished by connecting one side of a reactor 60 to the output end of one of phase windings 12, 14 or 16, and the other side of reactor 60 to the terminal on bridge rectifier 34 to which either of the remaining phase windings is connected. In other words, the remaining side of reactor 60 should not be connected to the the terminal on bridge rectifier 54 to which its associated phase winding is connected. For example, as shown in FIG. 3, one side of reactor 60 may be connected to the output end of phase winding 14 at terminal 62, and the remaining side of reactor 60 is connected to terminal 56 on rectifier 34. The reactor 60, instead of being connected to terminal 56 on bridge rectifier 34, could just as effectively be connected to terminal 52. Further, the reactor 60 could be connected to the output end 74 of phase winding 12 and to either terminal 54 or 56 of bridge rectifier 34; or, reactor 60 could be connected to the output end 76 of phase winding 16, and to either terminal 52 or 54 of bridge rectifier 34.

When the potential at terminal 62 is positive, current will flow through reactor 60, rectifier 44, field winding 18, rectifier 42, and to the negative end of phase winding 14 from terminal 54. When the potential at terminal 62 is negative, current will flow from the other end of phase winding 14, through rectifier 40, field winding 18, rectifier 46, reactor 60, and back to terminal 62. This provides full-wave rectified single-phase excitation current to field winding 18, with the field current being supplied entirely by phase winding 14 at no load.

Reactor 60 produces a substantially constant field current as the voltage and frequency output of the alternator 10 change, thus keeping the ratio of voltage to frequency constant at no load. As the voltage across reactor 60 increases, the frequency also increases. However, the impedance of reactor 60 increases proportional to the frequency, and the current caused to flow by the higher voltage thus stays substantially constant. The reactor 60 should be designed to provide just sufficient field current for field winding 18 for no-load excitation. Then, as the alternator system is loaded, the load current flowing through bridge rectifier 34 will provide the additional field current required to maintain substantially constant voltage at any load and a substantially constant voltage to frequency ratio at any speed. A decreasing or increasing voltage versus load characteristic may be obtained, if desired, by proper design of the field winding 18 and reactor 60.

Figure 4:
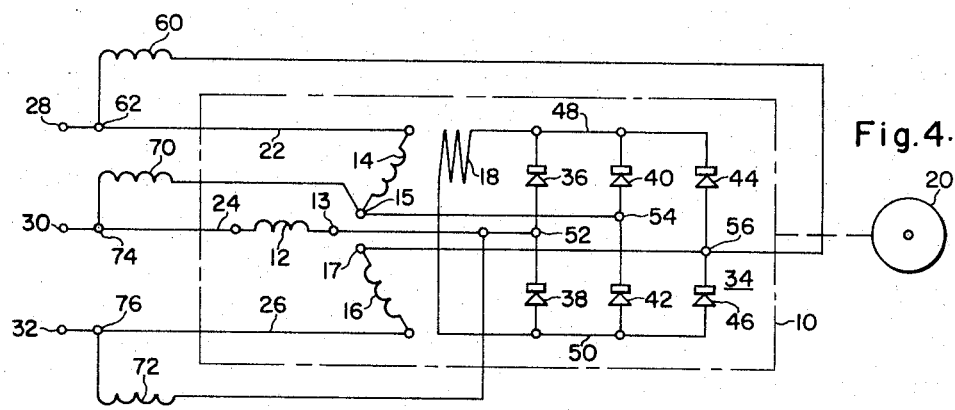
FIG. 4 is a schematic diagram illustrating the circuit of FIG. 3, except with a reactor in each phase of the alternator.

If the unbalance in the alternator system caused by the use of a single reactor 60 is objectionable, a three phase reactor, or three single phase reactors may be utilized, as illustrated in FIG. 4. Like reference numerals in FIGS. 3 and 4 refer to like components. More specifically, in addition to reactor 60, shown in FIG. 3, reactors 70 and 72 may be connected to the output terminals of phase windings 12 and 16, respectively, with reactor 70 being connected to terminal 74 and reactor 72 being connected to terminal 76. The remaining sides of reactors 70 and 72 are connected to terminals 54 and 52, respectively, of bridge rectifier 34. The operation of the circuit illustrated in FIG. 4 is the same as described relative to the circuit shown in FIG. 3.

Figure 5:
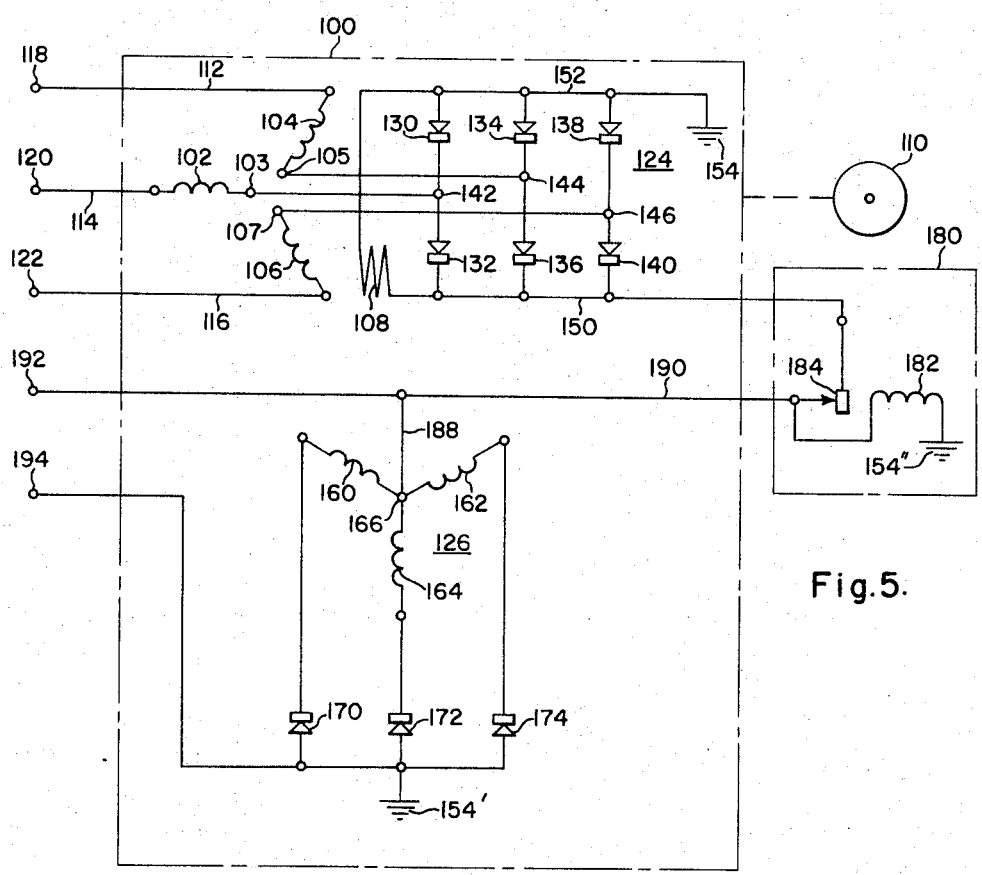
FIG. 5 is a schematic diagram illustrating how the circuit of FIG. 1 may be modified to provide a regulated output voltage, without requiring the regulator to control the total field current.

Regulating the output voltage of a self-excited alternator sometimes presents economic problems due to the fact that large field currents must be controlled, making necessary the use of large and expensive regulators. By using the teachings of this invention in eliminating the need for current transformers, and adding an auxiliary winding to the alternator whose output is rectified and controlled by a regulator, the size and cost of the voltage regulator utilized may be substantially reduced. FIG. 5 illustrates schematically a circuit for accomplishing this. FIG. 5 shows an alternator 100 having armature phase windings 102, 104 and 106, and a direct current field winding 108. The alternator 100 is driven by a suitable prime mover or drive 110, and delivers electrical energy through conductors 112, 114 and 116 to output terminals 118, 120 and 122, respectively.

Basically, the excitation requirement for field winding 108 is supplied from two sources, the three phase, full wave bridge rectifier 124 and auxiliary windings 126 of the alternator 100. Bridge rectifier 124, having rectifier devices 130, 132, 134, 136, 138 and 140, has its input terminals 142, 144 and 146 connected to the neutral ends 103, 105 and 107 of armature phase windings 102, 104 and 106, respectively, as hereinbefore described relative to FIG. 1. This arrangement eliminates the requirement of utilizing current transformers. The positive bus 150 of bridge rectifier 124 is connected to one side of field winding 108, and the negative bus 152 may be grounded at 154. The remaining side of field winding 108 may also be grounded at 154. The auxiliary windings 126, disposed on alternator 100, comprise phase windings 160, 162 and 164, which may be connected in a Y arrangement to a common point 166. The output of auxiliary windings 126 is rectified by rectifier devices 170, 172 and 174, and the unidirectional potential appears across terminal 166 and the anode side of rectifiers 170, 172 and 174, which may be grounded at 154'.

The rectified output of auxiliary windings 126 is regulated by voltage regulator 180, which includes an electromagnetic coil 182 and contacts 184. The rectified output of auxiliary windings 126 is connected to voltage regulator 180 through conductor 188 and bus 190. Bus 190 may also be used to supply regulated unidirectional potential to other loads, such as for battery charging, through terminals 192 and 194, with terminal 192 being connected to bus 190 and terminal 194 being grounded at 154'. The electromagnetic coil 182 of voltage regulator 180 is connected to bus 190 and to ground 154'', and contacts 184 are connected between bus 190 and direct current field winding 108. Thus, the field current required by field winding 108 is supplied from bridge rectifier 124, the output of which is unregulated, and from auxiliary windings 126, the output of which is regulated. The amount of excitation current supplied by auxiliary windings 126 is reduced by the amount of excitation current supplied by bridge rectifier 124. Thus, by designing bridge rectifier 124 to supply the major portion of the excitation requirements, only a small magnitude of current will be required through the regulator 180, reducing the regulator size and cost to a minimum. In situations when the major portion of the electrical output requirements are unidirectional, the series bridge rectifier 124 could be connected in the neutral of the auxiliary windings 126.

Figure 6:
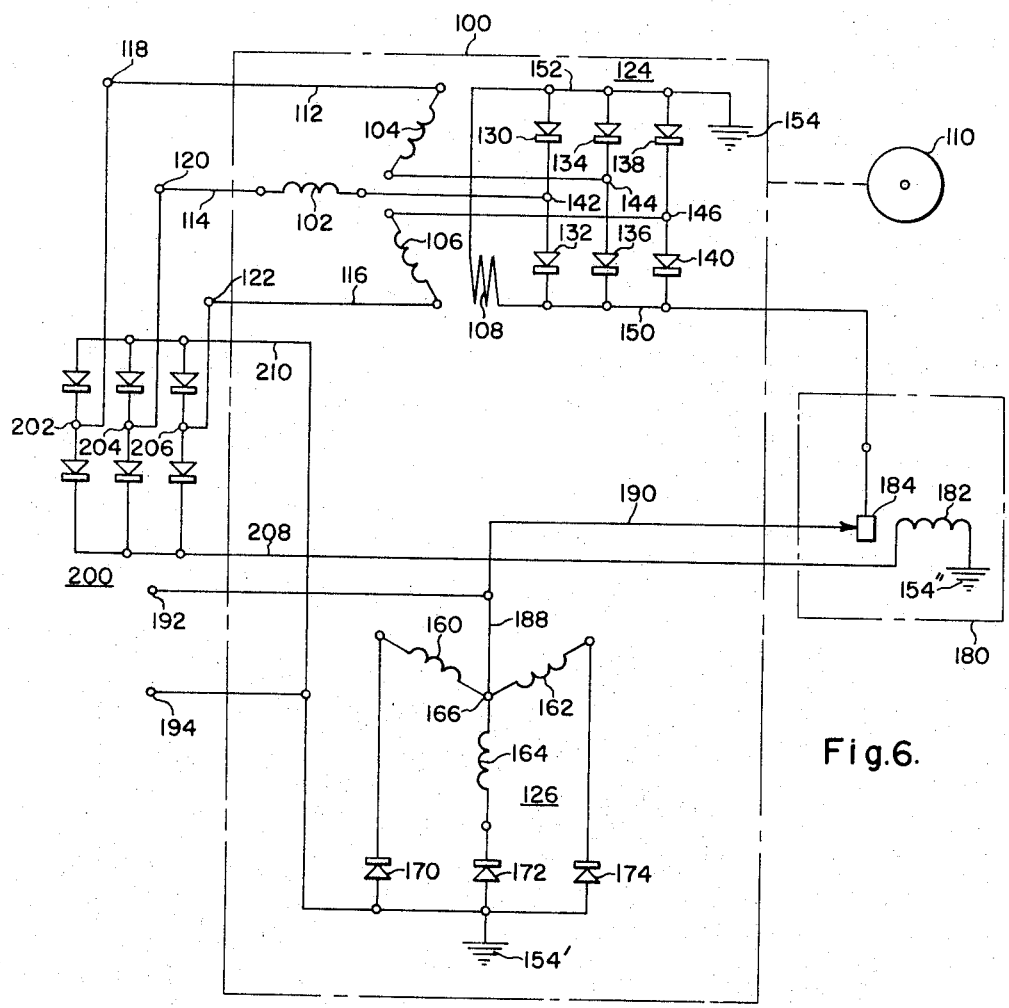
FIG. 6 is a schematic diagram illustrating another embodiment of the circuit shown in FIG. 5.

In the circuit arrangement illustrated in FIG. 5, regulator 180 is sensing the voltage at terminals 192 and 194, and is thus regulating the direct current voltage. In most systems requiring both direct current and alternating current voltages, it is desirable to regulate the direct current voltage. This is particularly true if the direct current voltage is used for battery charging purposes. When the direct current voltage is regulated, the alternating current voltage regulation will inherently be good, due to the fact that the alternating current windings 102, 104 and 106 and direct current windings 160, 162 and 164 are wound on the same core with excellent coupling. The only variation in the terminal voltage of one set of windings that will not be reflected into the other set of windings will be that due to the voltage drop in the windings. If it is desirable to obtain closer regulation of the alternating current voltage than obtainable due to the indirect regulation of the alternating current voltage just described, coil 182 of voltage regulator 180 may be connected to sense the voltage at alternating current terminals 118, 120 and 122, as shown in FIG. 6. Like components in FIGS. 5 and 6 are indicated with like reference numerals. This may be done, as shown in FIG. 6, by using a three phase rectifier 200 or any other suitable means. Rectifier 200 has its input terminals 202, 204 and 206 connected to output terminals 118, 120 and 122, respectively, and its output conductors 208 and 210 connected across the coil 182 of voltage regulator 180. Thus, the amount of excitation supplied by auxiliary windings 126 to field winding 108 will directly regulate the alternating current voltage applied to terminals 118, 120 and 122, and the direct current voltage appearing at terminals 192 and 194 will be indirectly regulated.

Thus, there has been disclosed a new and improved self-excitation system for alternating current generators or alternators which eliminates the necessity of utilizing current transformers, reducing the size, maintenance and cost of the excitation system, as shown in FIG. 1. Further, a self-excitation system constructed according to the teachings of this invention has other distinct advantages, whether the alternator is of the constant speed type, regulated type, or of the variable speed type with a constant ratio of output voltage to output frequency. If the alternator has a variable speed drive, and a constant voltage to frequency ratio is desired, it may be self-excited by adding a reactor, or reactors, as shown in FIGS. 3 and 4. If the alternator is of the constant speed type or if the output voltage is regulated, a compound self-excited system may be used, with the auxiliary unidirectional supply being obtained by rectifying the output voltage of the alternator as shown in FIG. 2. Further, if the alternator is regulated, a smaller regulator may be used by supplying the major portion of the excitation from the rectifiers connected in the neutral of the alternator, and generating a small additional potential in auxiliary windings of the alternator. This additional potential may be rectified and controlled by a voltage regulator to supply the additional excitation requirements needed to regulate the output voltage of the alternator, as shown in FIG. 5.

Since numerous changes may be made in the above-described apparatus and different embodiments of the invention may be made without departing from the spirit and scope thereof, it is intended that all matter contained in the foregoing description, or shown in the accompanying drawings, shall be interpreted as illustrative and not in a limiting sense.

I claim as my invention:

1. An electric circuit comprising an alternating current generator having a field winding and output terminals, said alternating current generator having a plurality of phase windings each having an output end and a neutral end, the output end of said plurality of phase windings being connected to the output terminals of said alternating current generator, rectifier means having input terminals and output terminals, the neutral ends of said plurality of phase windings being connected to the input terminals of said rectifier means, the output terminals of said rectifier means being connected in circuit relation with the field winding of said alternating current generator, reactor means, said reactor means having one end thereof connected in circuit relation with one of the output ends of said plurality of phase windings, and its other end connected in circuit relation with one of the input terminals of said rectifier means other than the input terminal to which its associated phase winding is connected, said rectifier means and said reactor means providing field excitation current for said field winding, with said rectifier means providing field current responsive to the magnitude of the load on said alternating current generator when said output terminals are connected to a load circuit, and said reactor means providing a constant field current, enabling said alternating current generator to provide an output at said output terminals having a substantially constant voltage to frequency ratio from no-load to full-load.

2. An electric circuit comprising a three phase self-excited alternating current generator having a direct current field winding and output terminals, driving means driving said alternating current generator which may vary in driving speed, said alternating current generator having first, second and third phase windings, each having an output end and a neutral end, the output ends of said first, second and third phase windings being connected to the output terminals of said alternating current generator, rectifier means having alternating current input terminals and direct current output terminals, the neutral ends of said first, second and third phase windings being connected to the alternating current input terminals of said rectifier means, the direct current output terminals of said rectifier means being connected in circuit relation with the direct current field winding of said alternating current generator, reactor means, said reactor means having one end thereof connected in circuit relation with one of the output ends of said first, second or third phase windings, and its other end connected in circuit relation with one of the alternating current input terminals of said rectifier means other than the input terminal to which its associated phase winding is connected, said rectifier means and said reactor means providing field excitation current for said field winding, with said rectifier means providing field current responsive to the magnitude of the load on said alternating current generator when said output terminals are connected to a load circuit, and said reactor means providing a constant field current, enabling said alternating current generator to provide an output at said output terminals having a substantially constant voltage to frequency ratio from no-load to full-load.

3. An electric circuit comprising an alternating current generator having a field winding and output terminals, said alternating current generator having a plurality of phase windings each having an output end and a neutral end, the output end of said plurality of phase windings being connected to the output terminals of said alternating current generator, rectifier means having input terminals and output terminals, the neutral ends of said plurality of phase windings being connected to the input terminals of said rectifier means, the output terminals of said rectifier means being connected in circuit relation with the field winding of said alternating current generator, a plurality of reactors, said plurality of reactors each having one end thereof connected in circuit relation with an output end of one of said plurality of phase windings, and each of said plurality of reactors having its other end connected in circuit relation with one of the input terminals of said rectifier means other than the input terminal to which its associated phase winding is connected, said rectifier means and said reactors providing field excitation current for said field winding, with said rectifier means providing field current responsive to the magnitude of the load on said alternating current generator when said output terminals are connected to a load circuit, and said reactors providing a constant field current, enabling said alternating current generator to provide an output at said output terminals having a substantially constant voltage to frequency ratio from no-load to full-load.

4. An electric current comprising a three phase self-excited alternating current generator having a direct current field winding and output terminals, driving means driving said alternating current generator, said alternating current generator having first, second and third phase windings each having an output end and a neutral end, the output end of each of said first, second and third phase windings being connected to the output terminals of said alternating current generator, rectifier means having alternating current input terminals and direct current output terminals, the neutral ends of said first, second and third phase windings being connected to the alternating current input terminals of said rectifier means, the direct current output terminals of said rectifier means being connected in circuit relation with the field winding of said alternating current generator, first, second and third reactors, said first, second and third reactors each having one end thereof connected in circuit relation with an output end of one of said first, second and third phase windings, and each having its other end connected in circuit relation with one of the alternating current input terminals of said rectifier means other than the input terminal to which its associated phase winding is connected, said rectifier means and said reactors providing field excitation current for said field winding, with said rectifier means providing field current responsive to the magnitude of the load on said alternating current generator when said output terminals are connected to a load circuit, and said reactors providing a constant field current, enabling said alternating current generator to provide an output at said output terminals having a substantially constant voltage to frequency ratio from no-load to full-load.

References Cited
UNITED STATES PATENTS

| | | | |
|---|---|---|---|
| 2,524,166 | 10/1950 | Gartner | 322—24 |
| 2,709,776 | 5/1955 | Evans et al. | |
| 2,748,340 | 5/1956 | Brunner et al. | |
| 2,786,334 | 3/1957 | Wolf | 62—134 X |
| 3,034,035 | 5/1962 | Baumann et al. | 322—28 |
| 3,105,180 | 9/1963 | Burnett | 318—138 |
| 3,205,429 | 9/1965 | Robinson | 322—28 |

MILTON O. HIRSHFIELD, *Primary Examiner.*

J. J. SWARTZ, J. W. GIBBS, *Assistant Examiners.*